(12) United States Patent
Ney et al.

(10) Patent No.: US 7,228,281 B1
(45) Date of Patent: Jun. 5, 2007

(54) METHOD AND PROCESS FOR ACCUMULATING AND SUMMARIZING DATA FOR DEFINED TIME INTERVALS WITHIN A CUSTOMER INTERACTION SYSTEM

(75) Inventors: Richard Ney, San Jose, CA (US); Kevin Garcia, San Jose, CA (US); David L. Burns, San Francisco, CA (US)

(73) Assignee: Aspect Communications, San Jose, CA (US)

( * ) Notice: Subject to any disclaimer, the term of this patent is extended or adjusted under 35 U.S.C. 154(b) by 0 days.

(21) Appl. No.: 09/379,385

(22) Filed: Aug. 23, 1999

(51) Int. Cl.
*G06Q 99/00* (2006.01)

(52) U.S. Cl. .......................................................... 705/1

(58) Field of Classification Search .................... 705/1, 705/400; 709/224; 370/352; 707/62; 379/93.12, 379/32.01
See application file for complete search history.

(56) References Cited

U.S. PATENT DOCUMENTS

| | | | |
|---|---|---|---|
| 5,546,455 A | 8/1996 | Joyce et al. | |
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A * | 10/2000 | Beck et al. | 709/202 |
| 6,157,655 A * | 12/2000 | Shtivelman | 370/412 |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,256,620 B1 * | 7/2001 | Jawahar et al. | 707/2 |
| 6,263,049 B1 * | 7/2001 | Kuhn | 379/34 |

(Continued)

FOREIGN PATENT DOCUMENTS

WO   WO 98/42118   * 9/1998

OTHER PUBLICATIONS

No author; Call distribution boosts cable company's ratings; Oct. 1990; Modern Office Technology, v35, n10, p54 (2); Dialog copy pp. 1-2.*

*Primary Examiner*—Thomas A. Dixon
(74) *Attorney, Agent, or Firm*—Welsh & Katz, Ltd.

(57) ABSTRACT

A method of accumulating and summarizing a number of customer interaction records pertaining to a specific customer records system (e.g., an ACD) over a predetermined time period commences with the receipt of interaction record including interaction information describing customer interaction. For example, the interaction information could indicate the hold time for a particular call received at the ACD. A cumulative record to which the interaction record contributes is then identified, and the cumulative record is then automatically updated to reflect predetermined interaction information contained within the interaction record. For example, a cumulative log of hold times for the particular ACD over a predetermined time interval may be updated with hold time information included within the interaction record.

28 Claims, 12 Drawing Sheets

U.S. PATENT DOCUMENTS 6,345,305 B1   2/2002   Beck et al.
6,373,836 B1   4/2002   Deryugin et al.
6,389,007 B1   5/2002   Shenkman et al.
6,393,015 B1   5/2002   Shtivelman
6,732,156 B2   5/2004   Miloslavsky

* cited by examiner

METHOD AND PROCESS FOR ACCUMULATING AND SUMMARIZING DATA FOR DEFINED TIME INTERVALS WITHIN A CUSTOMER INTERACTION SYSTEM

FIELD OF THE INVENTION

The present invention relates generally to the processing, storing and accessing of information within a customer interaction system and, more specifically, to the accumulating and summarizing of customer interaction data within a customer interaction environment.

BACKGROUND OF THE INVENTION

To provide efficient customer support responsive to customer requests received via, for example, a telephone network or the Internet, an enterprise may employ a multiple customer interaction systems (also known as transaction processing systems). Examples of such customer interaction systems include Automatic Call Distributors, (ACDs), web servers, e-mail servers, work flow servers or network routers. These multiple customer interaction systems may be located at a single site (e.g., a call center) or may alternatively be distributed over multiple sites. In order to route customer requests efficiently to agents coupled to multiple customer interaction systems, it is advantageous for a customer interaction manager to have a site-wide or enterprise-wide view of resource availability and efficiency, regardless of the type of customer interaction system on which the relevant interaction occurred.

The presentation of information and statistics pertaining to various parameters within a customer interaction system to a manager is useful so as to allow the manager to reconfigure and allocate system resources, to thereby increase the efficiency with which customer interactions may be conducted. For example, consider the situation wherein a customer interaction system in the form of a ACD distributes telephone calls to multiple agents. Information concerning maximum hold times, average hold times, maximum talk times, average talk times, and ring times is useful to the manager in accessing performance of the relevant agents, and determining whether the relevant ACD is under- or over-staffed. The above-identified information may also be useful to an automatic alarm or re-configuration system that performs dynamic resource allocation and load balancing operations.

SUMMARY OF THE INVENTION

According to a first aspect of the present invention, there is provided a method of processing customer interaction records within a customer interaction system. An interaction record, including interaction information describing a customer interaction, is received. A cumulative record to which the interaction record contributes is identified. The cumulative record is modified to reflect the interaction information contained within the interaction record.

According to a second aspect of the present invention, there is provided a process for processing customer interaction records within a customer interaction system. A first process receives an interaction record including interaction information describing a customer interaction, and identifies a cumulative record to which the interaction record contributes. A second process modifies the cumulative record to reflect the interaction information contained within the interaction record.

According to a third aspect of the present invention, there is provided a computer-readable medium that stores a sequence of instructions that, when executed by machine, cause the machine to perform the above described method or any one of the methods described below.

Other features of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Customer Interaction Environment Overview

For the purposes of the present invention the term "interaction record" shall be taken to include any record that includes information pertaining to a customer interaction. The term "interaction record" shall not be limited to the specific structure or content described below. The term "customer interaction" shall be taken to include, but not be limited to, a telephone call, an e-mail request or response, a fax request or response, an instant messaging receipt or response, a web-based request or response, or any other communication between a customer and a service or product provider.

Figure 1:
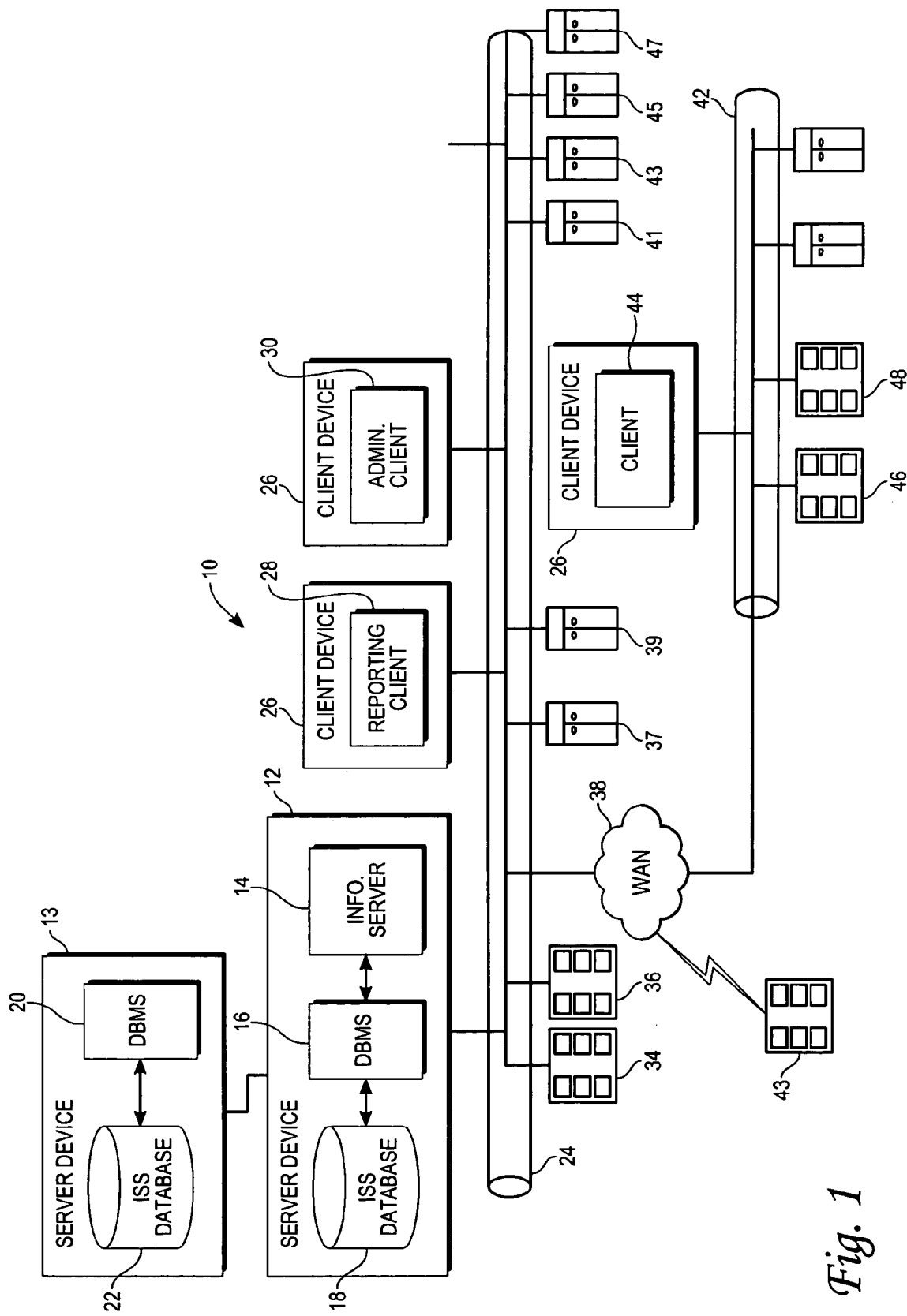
FIG. 1 illustrates an embodiment of an exemplary client interaction environment within which the present invention may be employed in accordance with the teachings of one embodiment of the present invention.

FIG. 1 is a diagrammatic representation of an exemplary customer interaction environment 10 within which the present invention may be employed. The customer interaction environment 10 includes a server device 12 that hosts an information server 14 and database management system (DBMS) 16. The information server 14 collects, processes, consolidates and provides access to near-real-time and historical transaction data generated by, and pertaining to, multiple customer interaction systems (e.g., ACDs, e-mail servers, web servers, Computer Telephony Integration (CTI) servers, and Interactive Voice Response (IVR) workflow servers, other workflow servers or network routers) and other devices, within the environment 10. The information server 14 accordingly functions as a framework for capturing, summarizing and storing interaction data form multiple sources, as will be described below.

The DBMS 16 may, for example, be the Oracle8 Server developed by Oracle Corp. of Redwood City, Calif., or the Sybase SQL Server developed by Sybase, Inc. of Emeryville, Calif., and comprises a collection of programs that maintain and facilitate access to an Information Server Software (ISS) database 18. The database 18 constitutes information (e.g., both data and metadata) regarding resource configurations, transactions and other environment parameters, conditions and functions (e.g., call, agent and truck events, fact records and summaries). A mirror server device 13, in one exemplary configuration, hosts a replicated DBMS 20 that may be implemented using the Oracle Advanced Replication Server, and that maintains and facilitates access to a replicated ISS database 22. The replicated DBMS 20 may be utilized as a standby or redundant system, or to generate historical reports. In an alternative configuration, the information server 14 may reside on the server device 12, and the DBMS 16 may reside on the server device 13 to facilitate off-board performance gains as the resources of the server device 12 are devoted exclusively to the information server 14.

The server device 12 is coupled by a Local Area Network (LAN) 24 to network devices 26, each of which hosts a software client. Of course, in an alternative embodiment, the LAN 24 may be replaced by any network type, such as for example, a Wide Area Network (WAN) or the Internet. The software clients may include a reporting client 28 and an administrative client 30. The reporting client 28 may be any Open Database connectivity (ODBC) compliant application, and makes queries against the database 18, and formats the results of these queries based on a predefined set of instructions (i.e., a report definition). The reporting client 28 may further include a method of scheduling reports to run at predetermined times. The administrative client 30 may be a Microsoft Foundation Class (MFC) 4.0 application, and could accordingly reside on a Windows 95, Windows NT workstation or Windows NT Server platform. The administrative client 30 facilitates configuration and management of the information server 14 on the server device 12. For example, utilizing a graphical user interface (GUI) provided by the administrative client 30, a system administrator may define data sources, set data destinations, specify rules, formulas and frequencies for data summaries, view server system metadata information, events, and task statuses. The administrative client 30 communicates with server components of the information server 14 through an Application Program Interface (API) that makes use of Remote Procedure Call (RPC) to facilitate remote management of the information server 14 over the LAN 24 or over a Wide Area Network (WAN) 38.

Also coupled to the LAN 24 (or WAN in an alternative embodiment) are a pair of customer interaction systems in the exemplary forms of Automatic Call Distributors (ACDs) 34 and 36, a workflow server 37, a network router 39, a CTI server 41, an IVR server 43, an e-mail server 45, and a web server 47. Each of the ACDs 34 and 36 may be the Aspect® ACD System manufactured by Aspect Telecommunications Corp. of San Jose, Calif. Each of the ACDs 34 and 36 is typically coupled to a Public Switched Telephone Network (PSTN) (not shown) via which the respective ACDs may receive transaction requests (e.g., phone calls from telephone units, such as those used in homes or businesses). Each of the ACDs 34 and 36 may also be coupled to the Internet, an Intranet, or any other network over which a transaction may be initiated. Also coupled to each of the ACDs 34 and 36 are a number of network devices (not shown) in the form of agent computers or telephone units via which human and/or software agents interact with a respective ACD and with customers.

The WAN 38 couples the LAN 24 to a remote LAN 42 and to a further ACD 34. A network device, and a further pair of ACDs 46 and 48 (or other customer interaction systems), are coupled to the remote LAN 42.

It will be appreciated that, in order to configure all customer interaction systems within the customer interaction environment 10 to handle customer requests and transactions efficiently, it would be advantageous to provide the system administrator with an enterprise-wide view of interaction activity that is occurring on all customer interaction systems within the environment 10. Similarly, in a single site deployment of multiple customer interaction systems, it is advantageous for the system administrator to have a site-wide view of transaction activity. Specifically, such site-wide or enterprise-wide views of transaction activity provide a system administrator with information required to schedule, compensate, review and allocate agents to as to increase customer satisfaction (e.g., by reducing customer wait time). Further, such site-wide or enterprise-wide views facilitate improved call processing and call routing across the entire site or enterprise, and also provide business and business component information that may be utilized to refine business models practices.

Data Path

Figure 2:
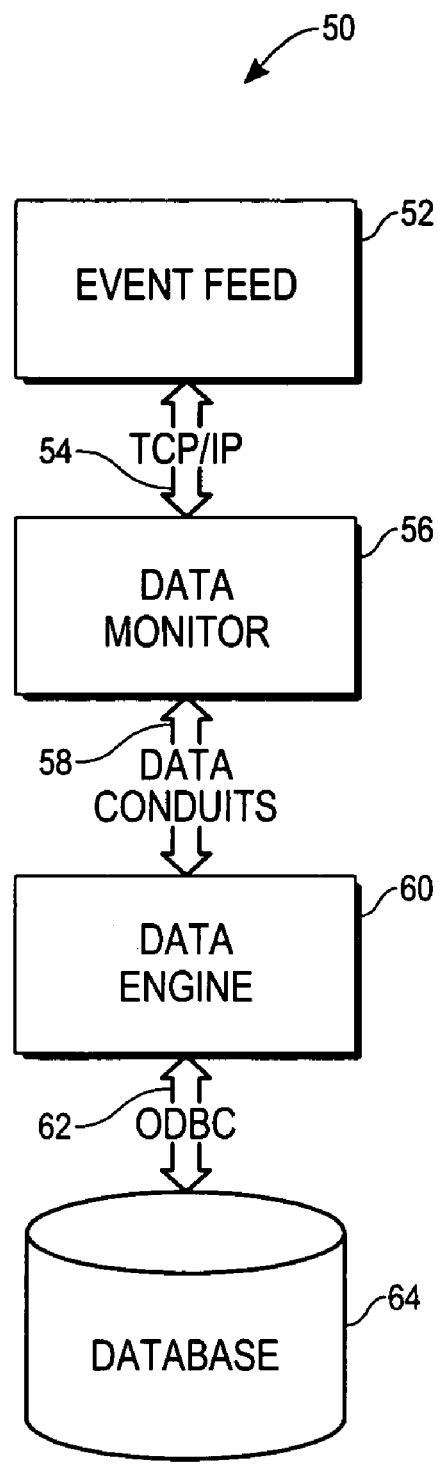
FIG. 2 illustrates one embodiment of a data path implemented within the client interaction environment in accordance with the teachings of one embodiment of the present invention.

FIG. 2 is a block diagram showing a data path 50, according to one exemplary embodiment of the present invention, implemented within the customer interaction environment 10. The data path 50 begins with an event feed 52, which may be TCP/IP based. Specifically, an event feed 52 may facilitate the supply of data from a customer interaction system (e.g., an ACD or other server) to the information server 14, concerning customer interaction system activity. The event feed 52 may be implemented by an event feed server (hosted on a customer interaction system) that supplies an event feed client within the information server 14 (hosted on the server device 12) with, merely for example, transaction detail records, daily summaries, or information regarding agent, call, trunk or configuration events. An event feed server 70 (described below) is responsible for gathering unprocessed transaction data from the various customer interaction subsystems of a customer interaction process system, and for the feeding of this interaction data to an event feed client 68 to implement an exemplary event feed 52. The event feed server 70 may also provide a fault tolerant link, for example utilizing the Remote Procedure Call (RPC) protocol, between the event feed server 70 and event feed client 68, and handles backup and online resynchronization functions.

A data monitor 56 processes both data and configuration messages received from the event feed 52 via a Transmission Control Protocol/Internet Protocol (TCP/IP) connection 54. Specifically, the data monitor 56 may transform the unprocessed interaction data received from the event feed 52 into "fact records" (e.g., call fact records, trunk fact records and agent fact records) that are exemplary embodiments of "interaction records". From the data monitor 56, fact records are propagated via data conduits 58 to a data engine 60 that buffers and summarizes the fact records, and performs block writes of records into a database 674 utilizing the Open DataBase Connectivity (ODBC) protocol, as indicated at 62. The use of the ODBC protocol provides portability to other databases.

Figure 3:
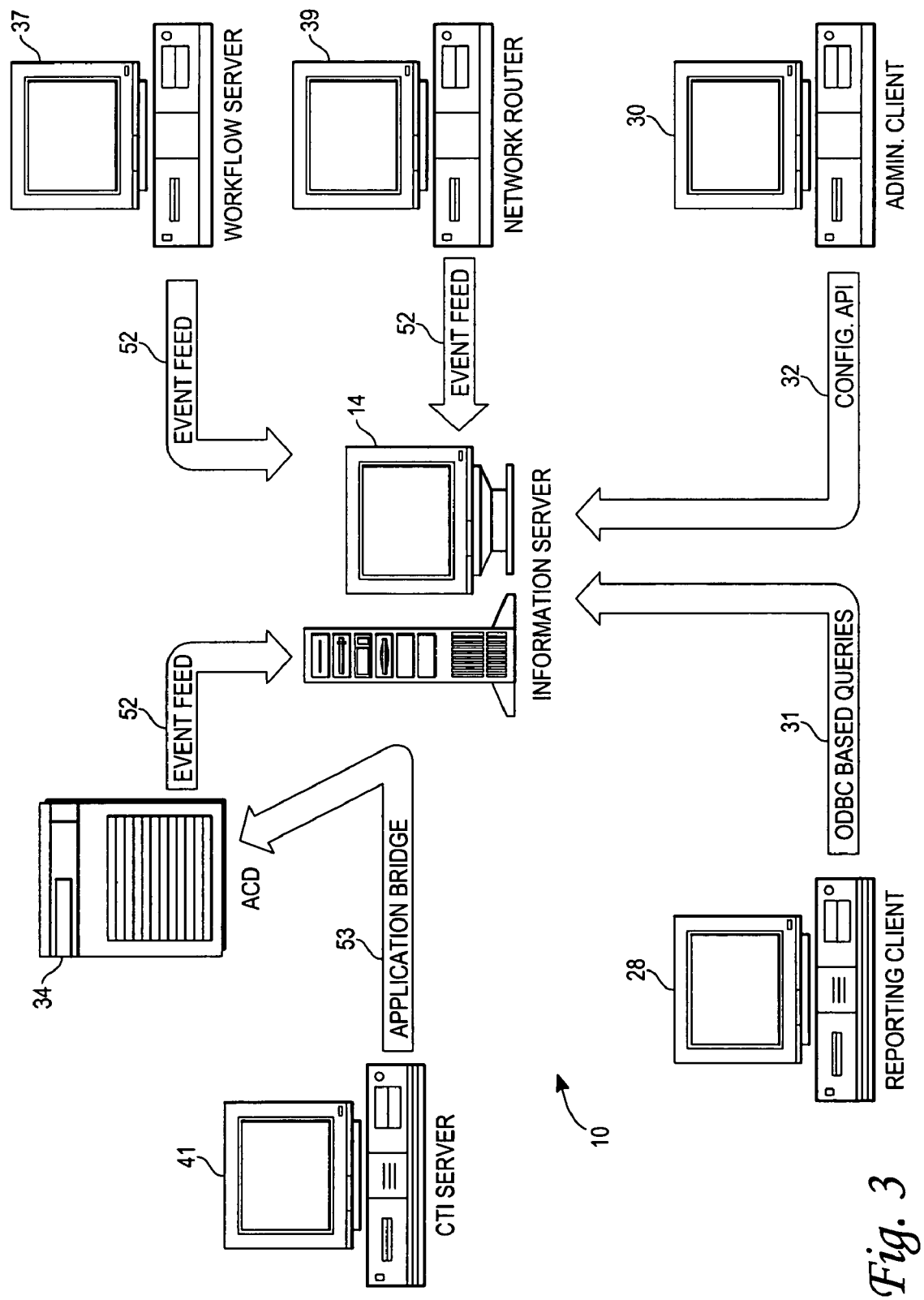
FIG. 3 illustrates an embodiment of exemplary client interaction system within an environment in accordance with the teachings of one embodiment of the present invention.

FIG. 3 is a diagrammatic representation showing exemplary customer interaction systems within a customer interaction environment 10 that may provide input to an information server 14. FIG. 3 illustrates, at a conceptual level, how respective event feeds 52, as well as other mechanisms and protocols, contribute to the supply data to the information server 14. For example, respective event feeds 52 are shown to provide interaction data from the ACD 34, the workflow server 37 and the network router 39 to the information server 14. The administrative client 30 is shown to provide input to the information server 14 via an Application Program Interface (API) 32, while the reporting client 28 is shown to propagate ODBC-based queries 31 to the information server 14. Finally, the CTI server 41 is shown to communicate with the ADCs 34 via a customized application bridge.

The Information Server-Overview

Figure 4:
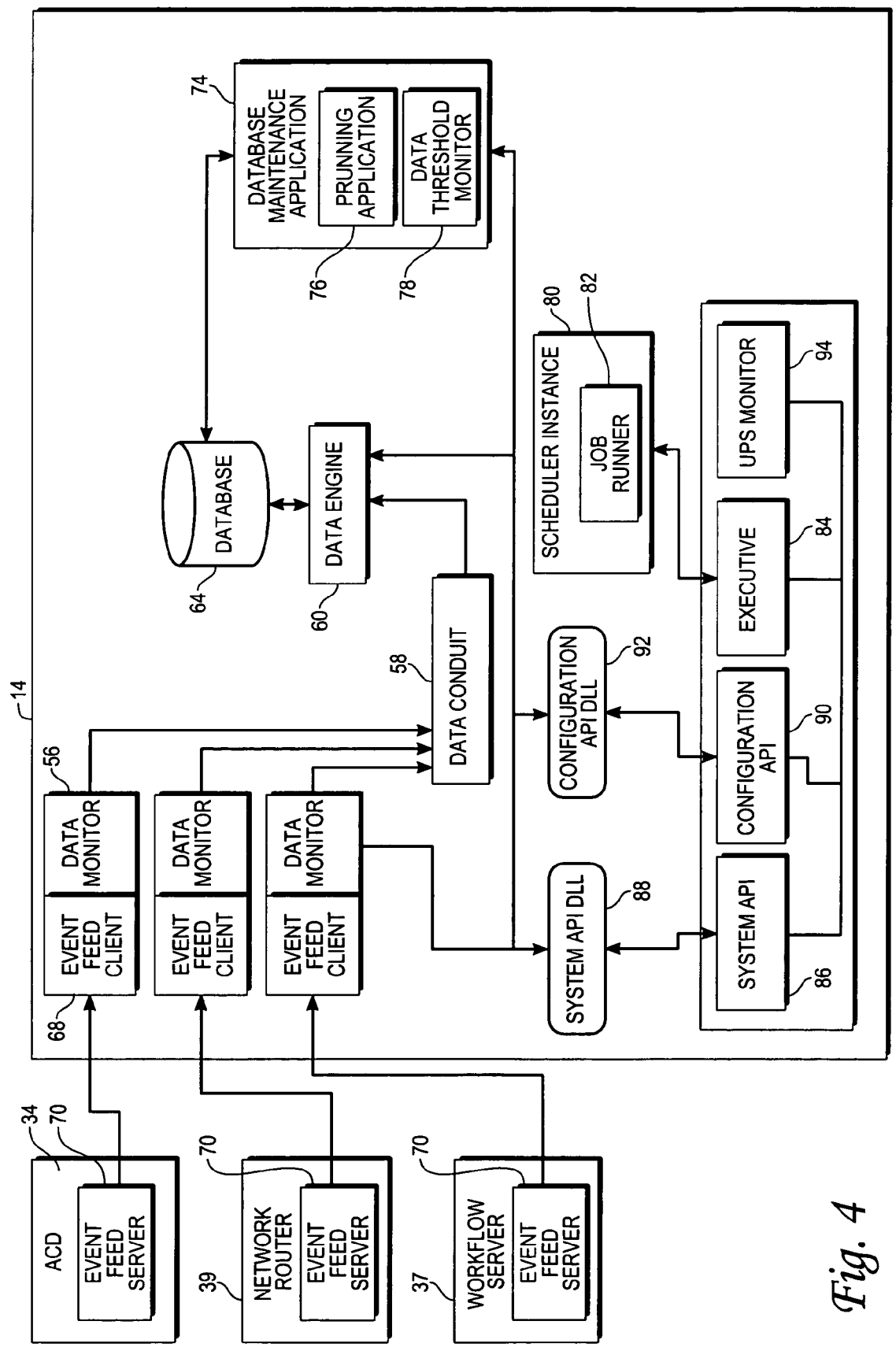
FIG. 4 illustrates an embodiment of an architecture of an exemplary information server hosted on a server device in accordance with the teachings of one embodiment of the present invention.

FIG. 4 is a block diagram illustrating the architecture of an exemplary information server 14 hosted on the serer device 12. The information server 13 includes a number of event feed clients 68, each of which receives unprocessed interaction information from an associated event feed server 70 hosted on a respective customer interaction system. In one embodiment, a number of separate event feed server-client pairs are provided to facilitate the provision of unprocessed interaction information to the information server 14 from different types of customer interaction systems that may implement different event reporting protocols. For example, a first event feed server-client pair may be utilized to provide unprocessed interaction information to the information server 14 from a network router 39, and a third event feed server-client pair may be utilized to provide unprocessed interaction information to the information server 14 from a workflow server 37. Further event feed server-client pairs may be utilized to provide information to the information server 14 from other devices or information resources.

In one exemplary embodiment of the present invention, an event feed server-client pair servicing an ACD 34 collects and buffers information concerning call events, agent events, trunk events and database events.

Database events that may cause an event feed server 70 hosted on an ACD 34 to send a database event message to an associated event feed client 68 include additions, deletions or other updates to a specific table within the ACD 34.

An event feed server-client pair servicing a network router 39, in one exemplary embodiment, manufacture route data records for the relevant network router 39. Each route data record may be assembled utilizing two messages propagated from the event feed server 70 to the event feed client 68. A first message contains information regarding an initial interaction request and a second message contains information regarding how the network router handled the interaction request. The event feed client 68 assembles these two messages into a single route data record that is available for storage and summarization. The event feed server 70 of a network router 39 may also send a number of database event messages to an event feed client 68, the database event messages corresponding substantially to those propagated by the event feed client of an ACD 34.

An event feed server-client pair servicing a workflow server 37, in one exemplary embodiment, may utilize workflow data messages, in addition to time strobes, to communicate information to the information server 14. For purposes of the present specification, the term "workflow" shall be taken to any predetermined sequence of steps that are performed by a customer interaction system in the processing of a transaction. For example, each execution of a workflow by a workflow server may generate a workflow message, containing information regarding the workflow and a specific execution instance.

Each event feed client 68 is associated with a respective data monitor 56, each data monitor 56 propagating fact records to a data engine 60 via a data conduit 58. From the data engine 60, summarized transaction information is written to the database 64 utilizing the ODBC protocol 62. The date conduit 58, as will be described in further detail below, operates to facilitate communication between, in one exemplary embodiment, (1) the data engine 60 and custom applications that may be implemented within the information server 14, and (2) the data monitors 56, each of which may be associated with an external customer interaction system. To this end, the data conduit 58 includes a set of functions that may be exported to custom applications within the information server 14. For example, the functions exported from the data conduit 58 allow an application to allocate and free shared memory record structures, pass shared memory record structures between applications, define records of interest, and read the form (or catalog) of a memory record structure. Specifically, utilizing the appropriate function, an application may read the number of fields, type and name of each field, and ordinal of each field within a memory record structure (or table).

The information server 14 further includes database maintenance applications 74 that include two primary applications, namely a pruning application 76, and a data threshold monitor 78 that together operate to maintain the data space usage within the database 64 within predefined boundaries, thereby preventing data space overflows. The pruning application 76 is responsible for pruning database tables within the database 64, and is launched by an executive model, that may be triggered by a scheduler instance 80 associated with a schedule event (or schedule entry). The data threshold monitor 78 provides a system Application Program Interface (API) for implementing and decrementing row counters for tables within the database 64. The data threshold monitor 78 furthermore launches the pruning application 76 when a table within the database 64 exceeds a predetermined threshold number of rows.

A scheduler instance 80 typically schedules "jobs" or application tasks within the information server 14 on hourly, daily, weekly or monthly schedules. To this end, a scheduler instance 80 may include a "job runner" application 82 that, in one exemplary embodiment, is launched by the Windows NT schedule service, and that coordinates with the executive module 84 to execute each job within the job group associated with a schedule entry. The job runner application 82 furthermore calls a system API from a system API module 86 via the system API Dynamic Link Library (DLL) 88 to schedule the next time at which the job runner application 82 should be launched to process a respective schedule entry.

The executive module 84 exercises control over the various software applications within the information server 14, such as the data monitors 56, the data engine 60 and possibly other custom applications. The executive module 84 is responsible for the start-up and shutdown of the software applications and, to this end, issues START and STOP control messages to the various applications. The executive module 84 also issues ADD and REMOVE conduit service messages to establish and tear down conduits between various applications. A configuration API module 90 is a Remote Procedure Call (RPC)-based set of functions that may be exported to various applications via a configuration API DLL 92. For example, the functions exported from the configuration API module 90 may allow an application to (1) enumerate, create, delete, read or write configuration metadata read from the database 64, and also to (2) start and stop other applications, such as a data monitor 56 and the data engine 60. A system API module 86 similarly is a RPC-based set of functions that may be exported to various applications via the system API DLL 88. For example, the functions exported from the system API module 86 may allow an application to request data feeds from other applications, and to add, delete and update data source supplied configuration data, such as user, group or application configuration data. Further, exported functions may allow an application to log events in a system event log, and to increment and decrement database threshold counters.

The information server 4 also includes an Uninterruptible Power Supply (UPS) monitor 94 that monitors UPS messages sent by, for example, a Windows NT® UPS service. The UPS monitor 94 then coordinates with the executive module 84 to shutdown appropriate parts of the information server 14.

Data Engine

Figures 5, 5A, 5B:
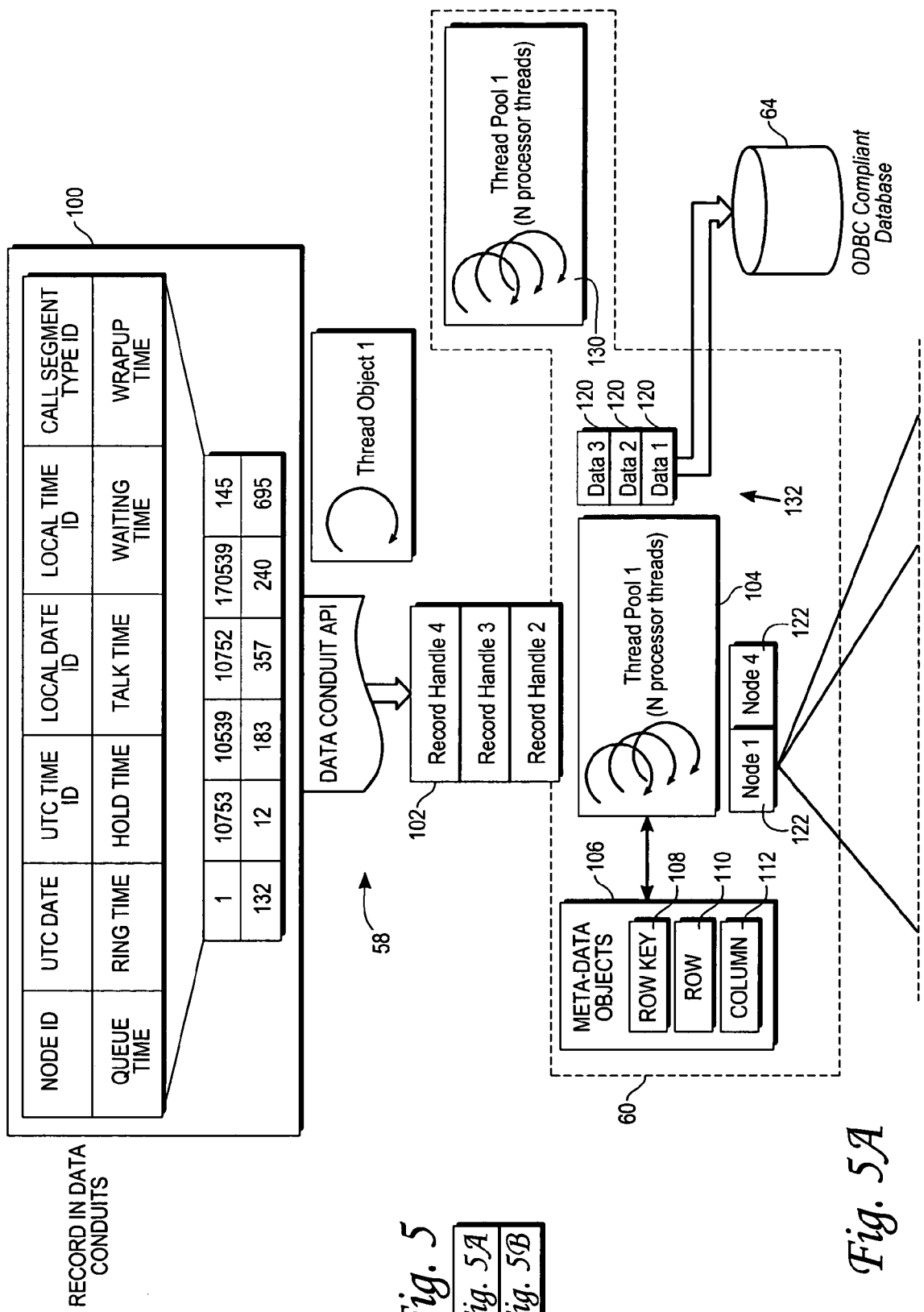
FIGS. 5A and 5B are block diagrams illustrating a data engine, according to an exemplary embodiment of the present invention, that may form part of an information server and that generates a result set for a predetermined time and customer interaction system, according to an exemplary embodiment.
Figure 5B:
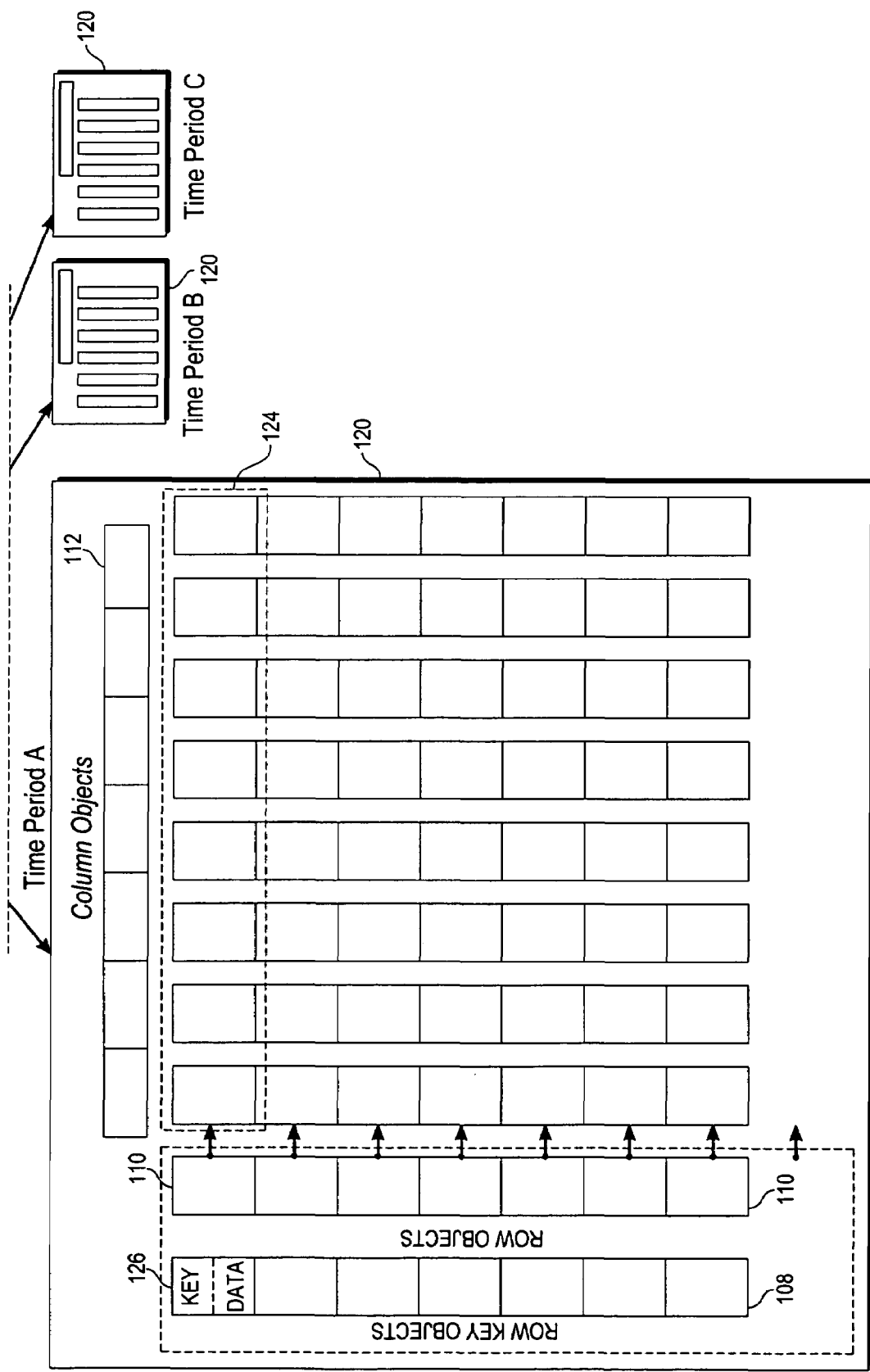

FIGS. 5A and B are diagrammatic representations of an exemplary embodiment of the date engine 60 that implements the teachings of the present invention. As illustrated in FIG. 4, the data engine 60 is operatively associated with the database 64 and the data conduit 58.

The data monitor 56 processes both data and configuration messages received from the event feed 52 via a Transmission Control Protocol/Internet Protocol (TCP/IP) connection 54. Accordingly, the data monitor 56 may transform the unprocessed interaction data received from the event feed 52 into "interaction records" in the exemplary form of "fact" records (e.g., call fact records, trunk fact records and agent fact records). From the data monitor 56, interaction records are propagated via data conduits 58 to a data engine 60 that buffers and summarizes select fact records, and performs block writes of the summarized fact records into a database 64 utilizing the Open DataBase Connectivity (ODBC) protocol or other associated protocol.

FIG. 5A illustrates an exemplary data engine 60 in operative association with the data conduit 58. The date conduit 58 contains different interaction records 100 relating to the different customer interactions (or transactions) carried out by a variety of customer interaction systems associated with the customer interaction environment 10. Accordingly, the data engine 60 is configured to extract interaction records 100 from the data conduit 58, each interaction record 100 comprising a series of individual data items, based upon a metadata schema or configuration. In one embodiment, the interaction records may be represented as "record handles", which are summarized representations of the interaction records 100, so that the entire interaction record 100 need not be processed by the data conduit 58.

As illustrated in FIG. 5A, an exemplary interaction record may include any one or combination of the following data items:

1. A node identifier that identifies a particular client interaction system to which the relevant interaction record 100 pertains (e.g., an ACD, a web server, or an e-mail server);
2. A Universal Time Coordinated (UTC) date identifier;
3. An UTC time identifier;
4. A local date identifier, indicating local date information for the relevant customer interaction system;
5. A local time identifier, indicating local time information for the relevant customer interaction system;
6. A call segment type identifier;
7. Queue time, indicating the time that a customer request of a customer interaction was queued within a customer interaction system;
8. Ring time, indicating the ring time between notification of an agent of a customer request and the relevant agents response thereto;
9. Call time, indicating the total communicative time that a customer may have been expended during a customer interaction;
10. Talk time, indicating the total time of active interaction and communication between a customer and an agent during a customer interaction;
11. Waiting time, indicating the total time that a customer was required to wait during a customer interaction; and
12. Wrap up time, indicating the time required to conclude a customer interaction.

Various exemplary and numeric values for each of the above identified data items are also shown.

FIG. 5A illustrates an exemplary embodiment of the present invention wherein record handles 102, each of which comprises a pointer or key to a respective interaction record 100, are communicated to the data engine 60 via the data conduit 58. Utilizing the record handles 102, the data engine 60 is able to identify and retrieve the full interaction records 100 from a memory location identified by the relevant record handle 102.

The data engine 60 is shown to include a first thread pool 104, comprising a number of processor threads that operate in parallel to process interaction records 100 received from the data conduit 58. To facilitate processing of the interaction records 100, the thread pool 104 is shown to access metadata objects 106 that provide metadata descriptions and information concerning the processing of the interaction records 100. The metadata objects 106 are furthermore shown to include row key objects 108, row objects 110 and column objects 112, the purpose and function of each of which will be described in further detail below. The metadata objects 106 are user configurable and allow a user (e.g., a customer interaction system manager) to specify the manner in which customer interaction information, embodied within interaction records 100, is accumulated and summarized by the thread pool 104.

The thread pool 104 is responsible for the accumulating and summarizing of interaction information, embodied within the interaction records 100, for specific customer interaction systems (e.g., an ACD, web server, e-mail server, IVR server, or CTI server) over a predetermined time period or "window" (e.g., one-minute to one-hour). To this end, the thread pool 104 is shown to construct, in memory of a computer system, a result set 120 for specified customer interaction systems over specified time periods, as illustrated in FIG. 5B, according to an exemplary embodiment of the present invention. The thread pool 104 is shown to accordingly produce in memory a collection 122 of result sets 120, each for a predetermined time period for each custom interaction system within a monitored environment 10.

Turning now specifically to each result set 120, each result set 120 is constructed by a thread within the thread pool 104 utilizing the metadata objects 106, and specifically the row key, row and column objects 108, 110 and 112. A result set 120 may be viewed as a "matrix" of summarized or cumulative information for a customer interaction system over a predetermined time period (e.g., time period A). The result set 120 is populated by a number of rows 124, each row 124 comprising a cumulative record of information regarding a predetermined characteristic of a customer interaction system. For example, one row may comprise accumulated and summarized information regarding calls over a particular call segment, whereas another row 124 may accumulate and summarize information regarding the talk time for a particular agent, or group of agents, serviced by a particular ACD. The a content of each row 124, or cumulative record 124, is constructed by the thread pool 104 utilizing a combination of the row key, row and column objects 108, 110 and 112. In summary, the row key and row objects 108 and 110 specify a key object 126 that is utilized to identify an interaction record 100 that is applicable to a relevant cumulative record 124, a data object 128 that is associated with a key object 126 and utilized to identify an appropriate row object 124, and a row object 110 that specifies a memory offset to which the data item, identified by the data object 128, is to be applied. In identifying a memory offset, the row object 110 identifies a column object 112 that in turn specifies a data operation to be performed with respect to the cumulative record 124 identified by the data object 128.

Returning to FIG. 5A, the data engine 60 is also shown to include a second thread pool 130 that is responsible for writing result sets 120, as constructed in memory by the thread pool 104, to the database 64 to thereby stored a set of cumulative (or summarization) records within the database 64. This end, the data engine 60 is also shown to implement a queue 132 of result sets 120, that is fed by the thread pool 104 and emptied by the thread pool 130.

Figure 6:
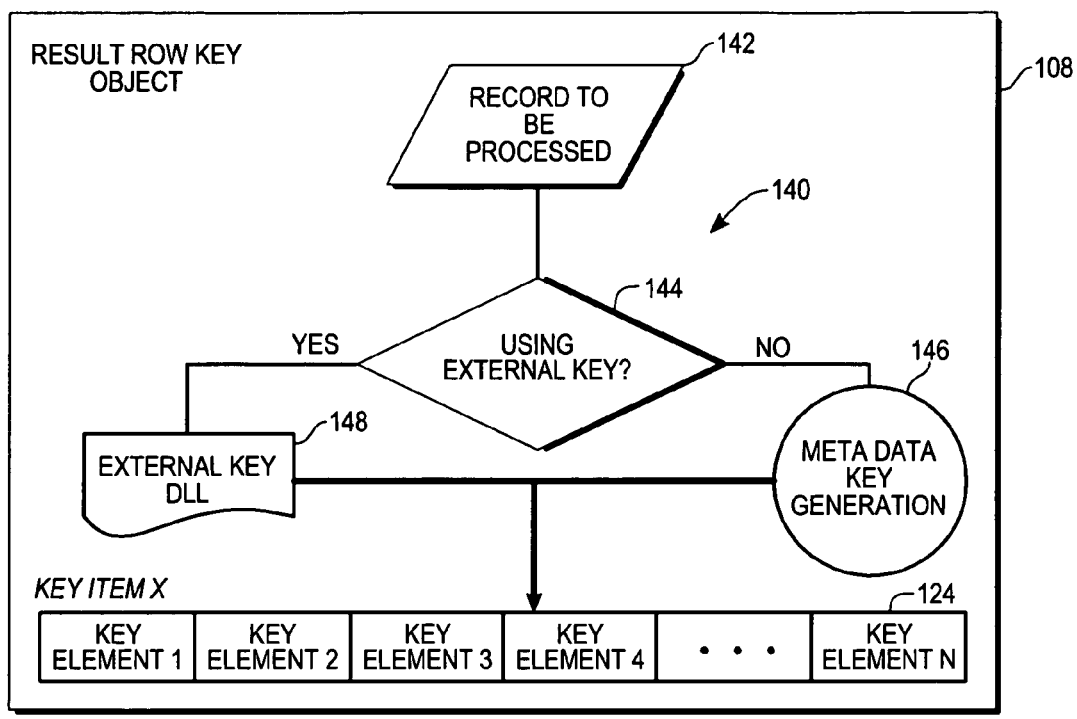
FIG. 6 is a flow chart illustrating a first process, according to an exemplary embodiment of the present invention, that may be embodied within a row object.

Further details will now be provided regarding the metadata objects 106, specifically the row key, row and column objects 108, 110 and 112. FIG. 6 is a flowchart illustrating a method 140, according to exemplary embodiment of the present invention, that is implemented utilizing a row key object 108 associated with each row, or cumulative record 124, within a result set 120. The method 140 begins at step 142 with a determination by a thread of the thread pool 104 as to whether an interaction record 100 received at the thread pool 104 is to be processed for a specific row key object 108 within an extant result set for a particular client interaction system. This determination is made for each row key object 108. Further details regarding this determination are described are with reference to FIG. 10. A further determination is then made at decision box 144 as to whether an external key is to be utilizing to identifying the data object 128 that points to the appropriate row object 110, which in turn provides the memory offset associated with a particular column objects 112. Following a determination at decision box 144 that an external key is not to be utilized, the method 140 proceeds to step 146, where a metadata key (i.e., key to reference the key objects 126) is generated and utilized to determine an offset position within a cumulative record 124. On other hand, should it be determined at decision box 144 that an external key is to be used, an external key Dynamic Link Library (DLL) is accessed at step 148 to provide the proper offset within the appropriate cumulative record 124.

Figure 7:
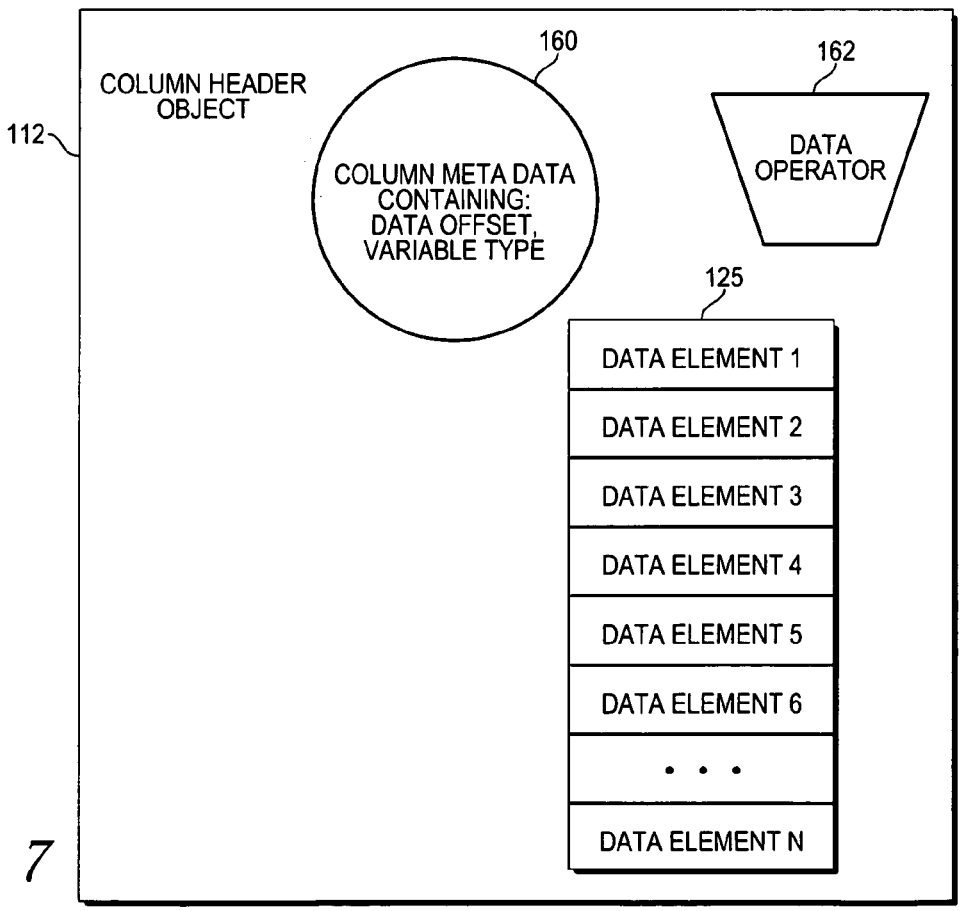
FIG. 7 is a diagrammatic representation of a column object, according to an exemplary embodiment of the present invention, that includes a data operator that pertains to a specific column of a result set.

FIG. 7 is a diagrammatic representation of a column object 112, according to an exemplary embodiment of the present invention. The column object 112 is shown to include column metadata 160 that describes the "columns" constituted by entries within various cumulative records 124 of a result set 120. Specifically, the column metadata 160 specifies a data offset, within each of the cumulative records 124, at which an entry that forms part of a column (to which the column object 112 applies) is located. The column metadata 160 furthermore specifies a variable type (e.g., integer, alphanumeric, string) for data contained in entries comprising the relevant column. The column objects 112 further include a data operator 162 that specifies a particular data operation to be performed to modify, or update, the entry of each cumulative record 124 within the relevant column upon the receipt by the data engine 60 of an interaction record 100 that contributes to the relevant cumulative record 124. For example, the data operation specified by a data operator 162 could comprise any one of the following:

1. A "sum" operation whereby the relevant entry of the cumulative record 124 is updated by adding an information item contained within a received interaction record 100 to the stored contents of the relevant entry;
2. A "count if greater than" operation whereby the relevant entry of a cumulative record 124 is updated by incrementing a count maintained within the entry if an information item contained within the received interaction record 100 includes a value greater than a predetermined threshold value;

3. A "count if less than" operation whereby the relevant entry of a cumulative record 124 is updated by incrementing a count maintained within the entry if an information item contained within the received interaction record 100 includes a value less than a predetermined threshold value;

4. A "count if equal to" operation whereby the relevant entry of a cumulative record 124 is updated by incrementing a count maintained within the entry if an information item contained within the received interaction record 100 includes a value equal to a predetermined value;

5. A "count if not equal to" operation whereby the relevant entry of a cumulative record 124 is updated by incrementing a count maintained within the entry if an information item contained within the received interaction record 100 includes a value not equal to a predetermined value;

6. A "replace if maximum" operation whereby the relevant entry of a cumulative record 124 is updated by replacing the stored content of the entry of the cumulative record 124 with an information item contained within the received interaction record 100 if the information item has a value greater than the stored content;

7. A "replace if minimum" operation whereby the relevant entry of a cumulative record 124 is updated by replacing the stored content of the entry of the cumulative record 124 with an information item contained within the received interaction record 100 if the information item has a value less than the stored content; and 8. A "copy" operation, whereby the relevant entry of the cumulative record 124 is updated by simply replacing the stored content thereof with an information item contained within the received interaction record 100.

It will be appreciated that any operation and qualifier combination could be used to specify the data operation dictated by a data operator 162, and the above provided examples of "count if" and "replace if" operations are merely exemplary. The column object 112 is shown to be applicable to a column of data elements 125, each of the data elements, or entries, within the column 25 belonging to a discrete cumulative record 124.

Figure 8:
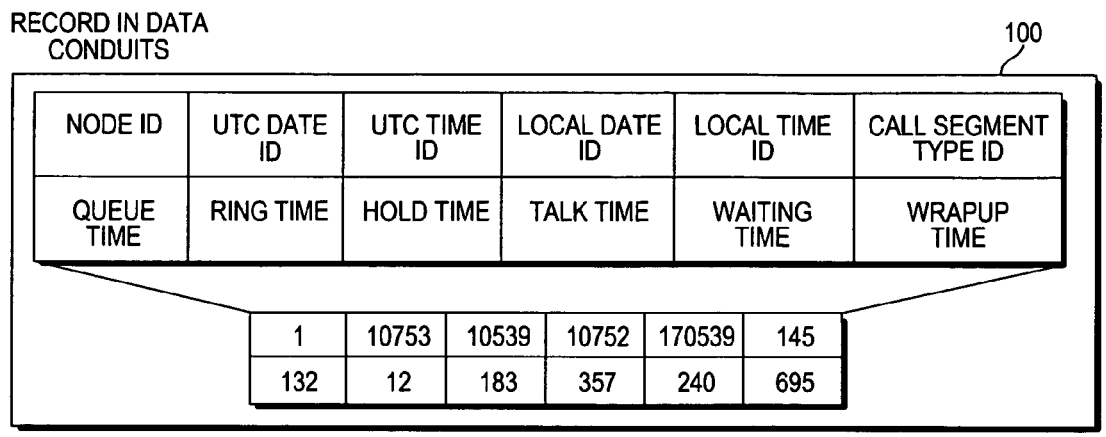
FIG. 8 is a flow chart illustrating a process, according to an exemplary embodiment of the present invention, of modifying a cumulative record to include information embodied within an interaction record received by the data engine, the cumulative record being for a predetermined time.
Figure 8:
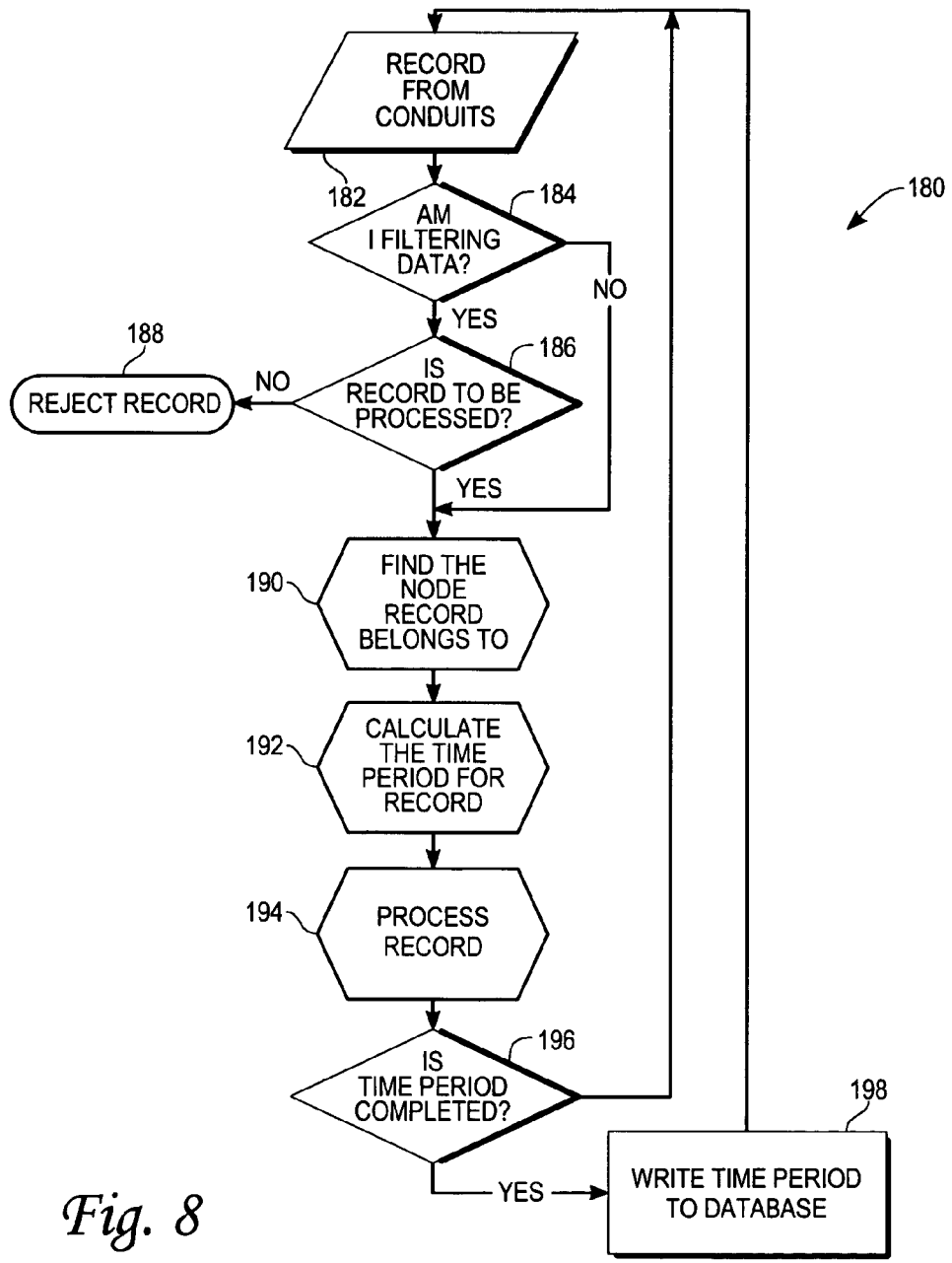

FIG. 8 is a flowchart illustrating a method 180, according to exemplary embodiment of the present invention, of processing a customer interaction record within a customer interaction environment 10. In an exemplary embodiment, the data engine 60 performs the method 180. However, it will be appreciated that the method 180 could similarly be performed by any appropriate process, and the data engine 60 is merely an example of one such process.

The method 180 commences at step 182 with the receipt of an interaction record 100 at the data engine 60 from a data conduit 58 that services a particular customer interaction system (e.g., an ACD). The interaction record 100 is communicated to the thread pool 104, where a determination is made at decision box 184 as to whether the data engine 60 is filtering data (i.e., whether the data engine 60 is only examining, accumulating and summarizing interaction record 100 that meet predefined filtering criteria). An interaction system manager may specify that, merely for example, interaction records 100 emanating from a particular source are not to be summarized. If it is determined at decision box 184 that the data engine 60 is filtering data, the method 180 proceeds to decision box 1186, where a further determination is made as to whether the interaction record 100 under consideration is to be processed. To this end, the received interaction record 100 may be compared against various filtering criteria and may be rejected at step 188. For example, should the interaction record 100 pertain to a blocked source, the method 180 will proceed to step 188, where the record will be rejected.

On the other hand, should it be determined that the data engine 60 is not filtering data at decision box 184, or that the interaction record 100 is to be processed at step 16, the method 180 proceeds to step 190, where the collection 122 of result sets 120 to which the interaction record 100 contributes is identified. This may involve identifying the source customer interaction system (or "node") to which the interaction record 100 applies. This determination is made utilizing, merely for example, the node identifier that is described as being included within each interaction record 100. Having identified the collection 122 of result sets 1202 to the interaction record 100 applies, the method 180 proceeds to step 192, and calculates a time period to which the relevant interaction record 100 belongs and accordingly to identify a result set 120 to which the interaction record 100 contributes. This determination may, in an exemplary embodiment, be performed utilizing the local time and data identifiers that are described above as being included within an exemplary interaction record 100.

At step 194, the interaction record 100 is processed in a manner that is more fully described below with reference to FIG. 10, so as to modify one or more cumulative records 124 within the identified result set 120 with information contained in the relevant interaction record 100. At step 196, a determination is made as to whether the time period for which the relevant result set 120 accumulates and summarizes interaction information has completed. If not, the method 180 then loops back to step 182, and the data engine 60 proceeds to retrieve a further interaction record 100 from the data conduit 58. On the other hand, should the time period for the relevant result set 120 have expired, the thread pool 104, at step 198, writes the relevant result set 120 to the queue 132 of result sets 120. The thread pool 130 than reads result sets 120 from queue 132, and writes these result sets 120 to the database 64.

Figure 9:
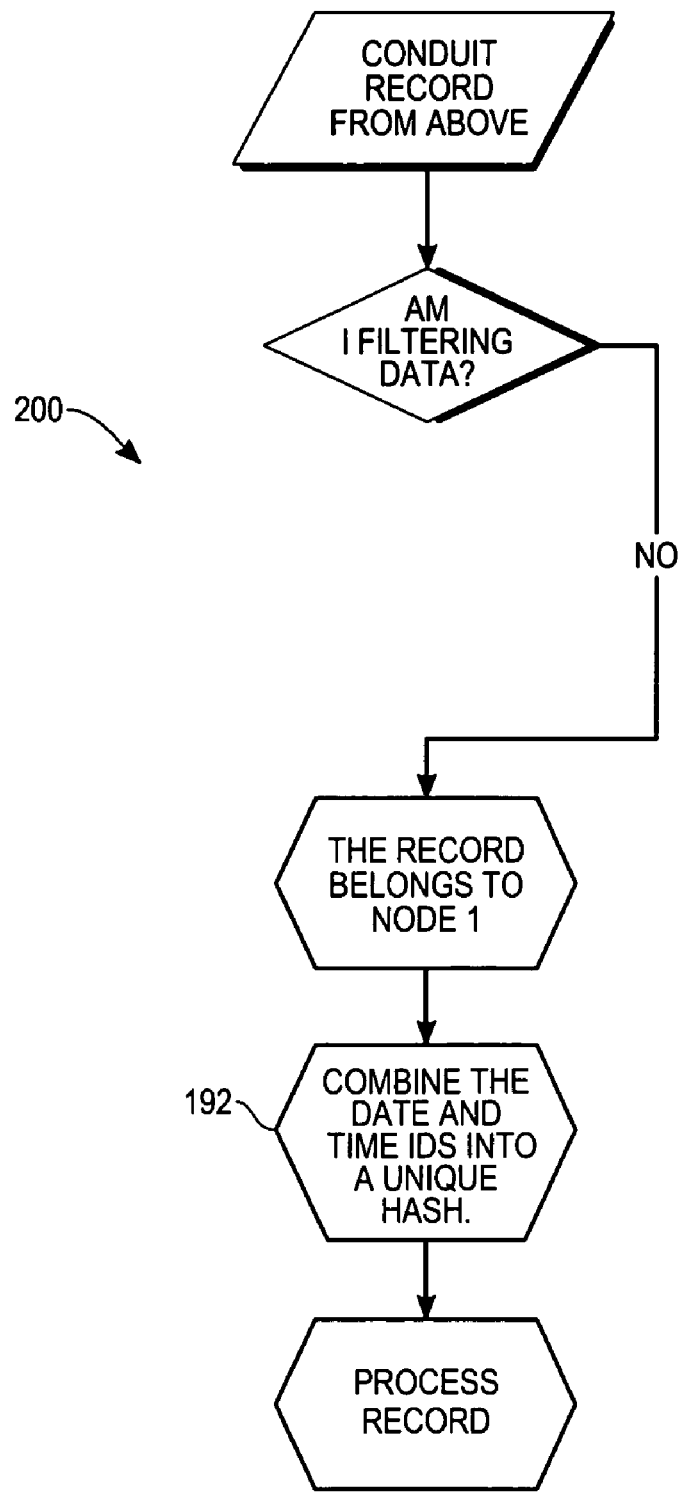
FIG. 9 is a flow chart providing an exemplary implementation of the process detailed by the flow chart shown in FIG. 8.

FIG. 9 is a flowchart illustrating an exemplary implementation 200 of the method 180 described with reference to FIG. 8. As can be seen from this exemplary implementation, the calculation of the time period for the interaction record 100 at step 192 may involve combining the date and time identifier into a unique hash at step 192.

Figure 10:
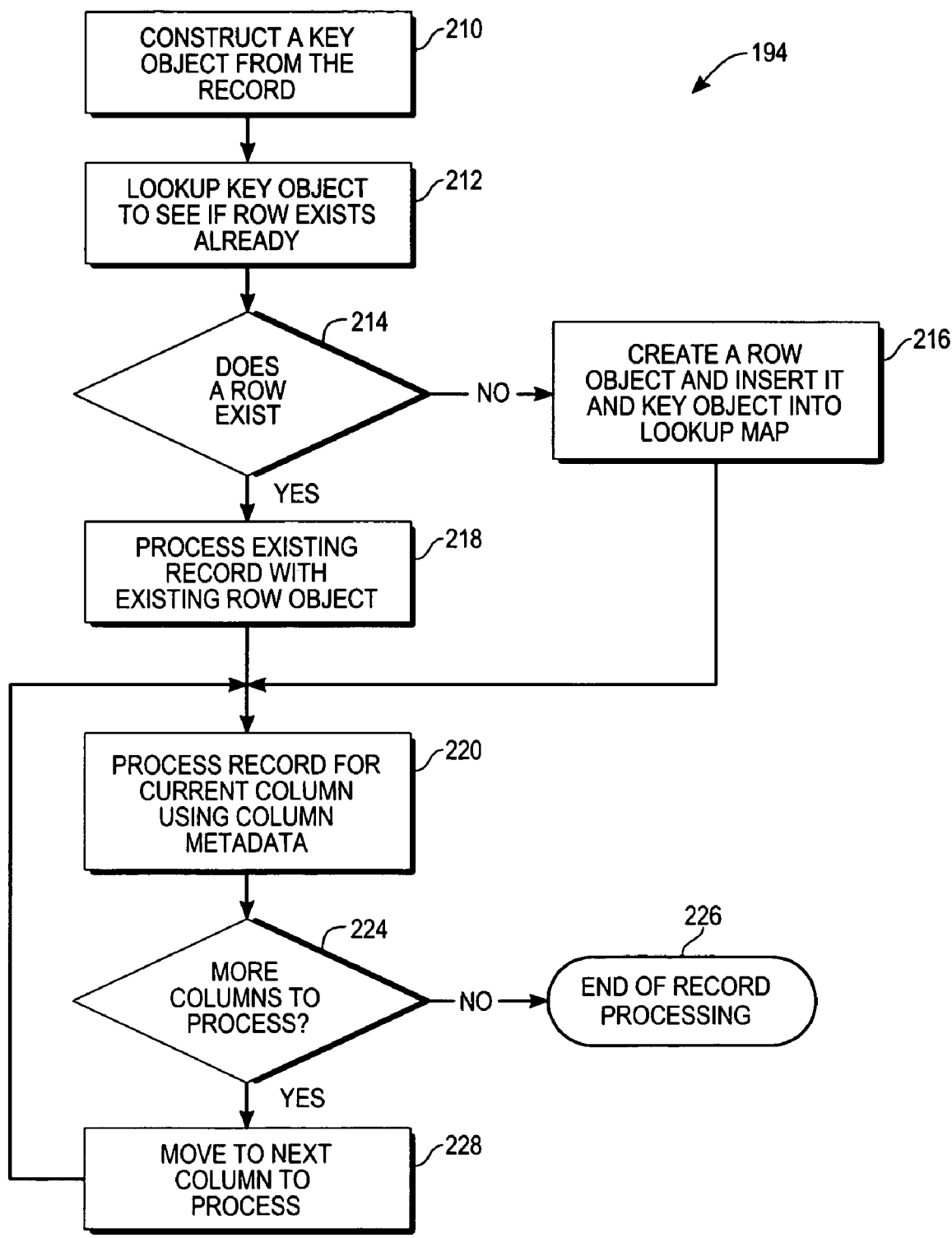
FIG. 10 is a flow chart illustrating further details regarding a process, according to an exemplary embodiment of the present invention, by which a cumulative record may be updated to reflect information contained within an interaction record.

FIG. 10 is a flowchart illustrating a method 194, according to exemplary embodiment of the present invention and corresponding to the step 194 illustrated in FIG. 8, of modifying a cumulative record 124 to reflect interaction information embodied within an interaction record 100. The method 194 is performed by individual threads of the thread pool 104, and is performed utilizing the metadata objects 106. Accordingly, each thread, when utilizing the metadata object 106 may be viewed as comprising two processes, namely a first process that is involved with the receipt and identification of an appropriate entry within a cumulative record 124 to which information embodied in the interaction record 100 contributes, and a second process that is involved with the actual updating or modification of the relevant entry within the cumulative record to reflect the information contained within the interaction record 100. The first process is performed by, or is embodied within, the row key and row objects 108 and 110, while the second process is performed by, or embodied within, the column objects 112.

Figure 11:
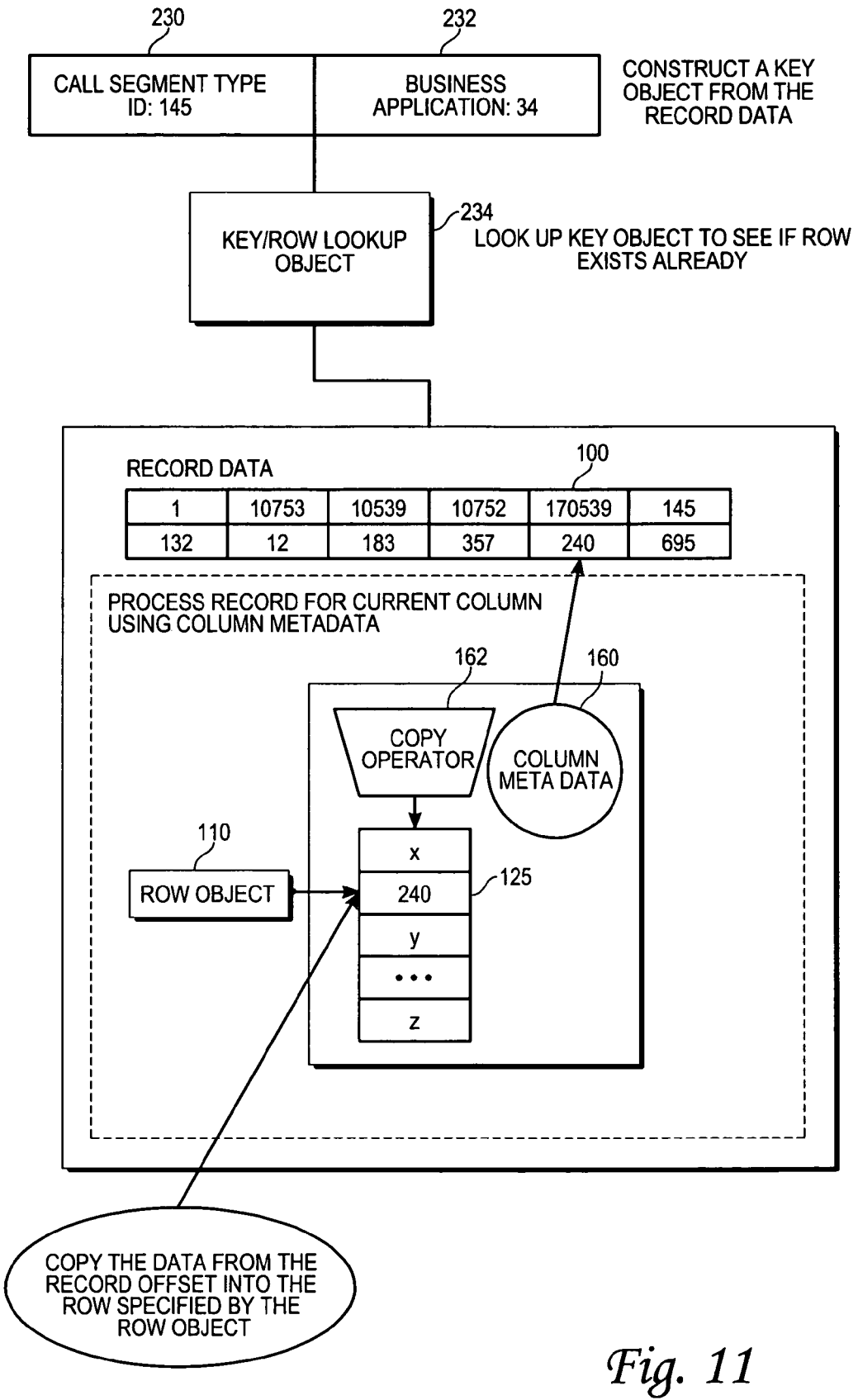
FIG. 11 is a diagrammatic representation of the data structures and processes involved in an exemplary performance of the process illustrated in FIG. 10.

The steps of the method 194 will be described with reference to both FIGS. 10 and 11. The method 194 commences at step 210 with the construction of a key object for the received interaction record 100. This key object (not shown) may be constructed utilizing any combination or derivative of the information embodied within the interaction record 100. Referring to FIG. 11, it is shown that a call segment type identifier 230 and a business application identifier 232 are combined to construct a key object from the data of the interaction record 100. The information that is utilized to construct the key object is specified by the metadata objects 106 that are accessed by the relevant thread of the thread pool 104 that performs the method 194. At step 212, a key/row lookup object 234 utilizes the key object constructed at step 210 to locate a row key object 108 corresponding to be constructed key object. Accordingly, the collection of row key objects 108 for a particular result set 120 may be viewed as an index that is searched by the key/row lookup object 234 to determine whether a cumulative record 124 (i.e., a row) exists within the relevant result set 120 to which the relevant interaction record 100 contributes.

At decision box 214, a determination is made as to whether a cumulative record 124 (i.e., a row) exists within the relevant result set 120 for the constructed key object. If not, at step 216, a row object 110 is automatically created, and the row object 110 and the constructed key object are then incorporated within the metadata objects 106. In this way, an appropriate row, and accordingly a new cumulative record 124, is created for the constructed key object, with the key object assuming the role of a key object 126 that forms part of a row key object 108.

Alternatively, should it be determined at decision box 214 that a cumulative record 124 already exists for the created key object, the method 194 proceeds to step 218, where the existing cumulative record 124 is modified, or updated, with the appropriate information contained within the interaction record 100. Specifically, at step 220, the appropriate entry within the cumulative record 124 is updated with information included in the interaction record 100 utilizing the column objects 112 of the metadata objects 106. As described above, once the constructed key object is mapped to a key object 126, that forms part of the row key objects 108, a data object 128 provides a pointer to an appropriate row object 110, that turn provides a pointer to offset within the cumulative record 124 at which the entry to be updated is located. The offset similarly identifies a column within which the entry to the updated is located, and accordingly a column object 112 that includes a data operator 162 and metadata 160 specifying a data offset within the interaction record 100 at which the data required by the data operator 162 is located. The data operator 162 then updates the appropriate entry (or "data elements") of the cumulative record 124, as specified by the data operator 162 utilizing the data identified by the metadata 160. This is indicated in FIG. 11, with the metadata 160 pointing to "waiting time" information within the interaction record 100, and the data operator 162 performing a "copy" operation utilizing this information as identified by the metadata 160.

At decision box 224, the thread of the thread pool 104 makes a determination whether any further columns (i.e., entries) of the cumulative record 124 are updated utilizing information contained in the interaction record 100. To this end, a row object 110 referenced to by the data object 128 of a row key object 108 may point to multiple offsets within a particular cumulative record 124, in which case the entries within the cumulative record 124 identified by each of these offsets must be modified, or updated, in the manner described above. Following a positive determination at decision box 224, the method 194 proceeds to step 228, whereafter the step 220 is again performed with respect to the further column. Alternatively, should it be determined at decision box 224 that no further columns or entries require processing or updating utilizing the interaction record 100, the method 194 terminates at step 226.

Computer System

Figure 12:
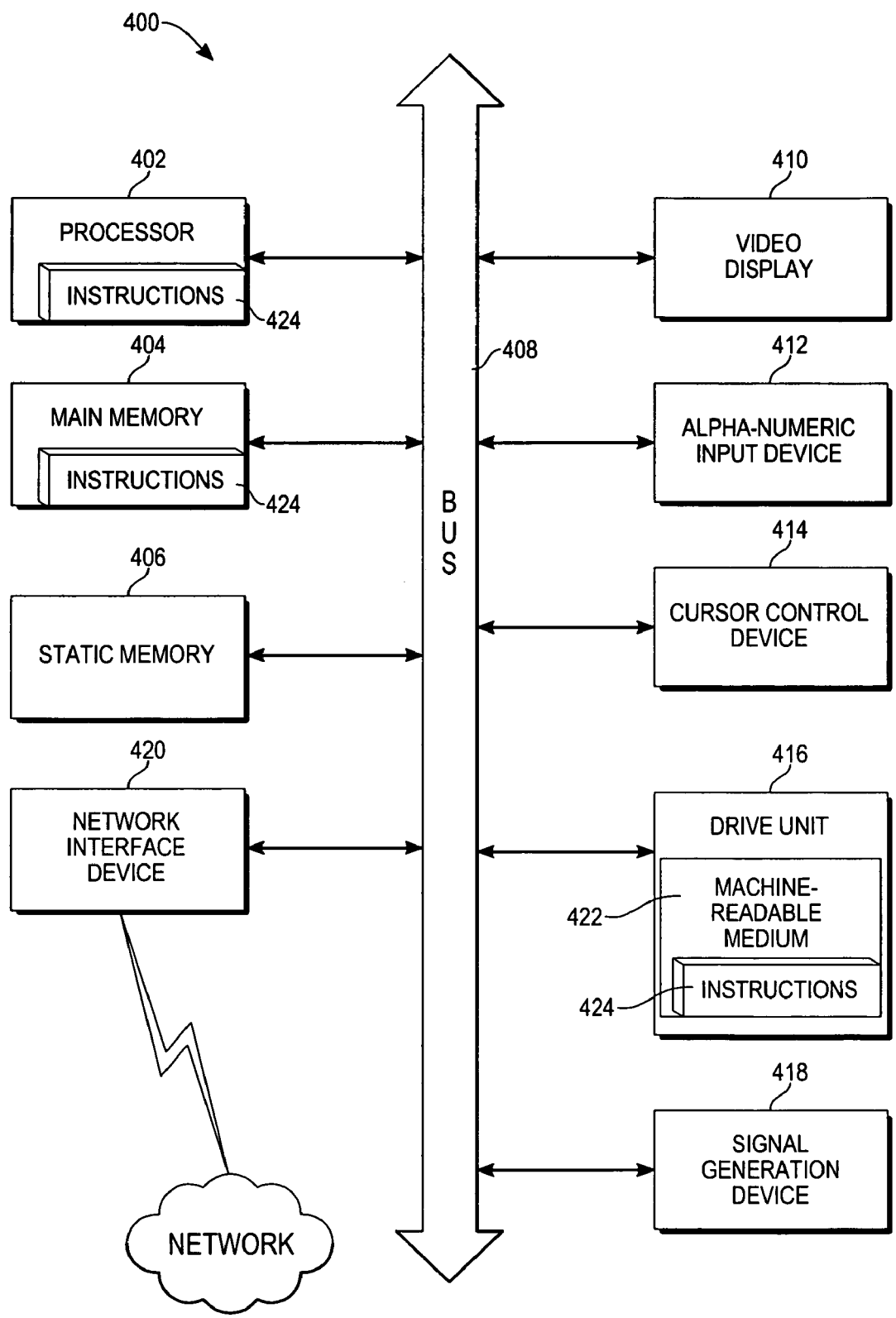
FIG. 12 is a block diagram of a machine, in the exemplary form of a computer system, within which any of the methods described below may be performed.

FIG. 12 is a block diagram illustrating a machine, in the exemplary form of a computer system 400, within which a set of instructions for causing the computer system 400 to perform any one of the methodologies discussed above may be executed. The computer system 400 includes a processor 402, a main memory 404, and a static memory 406, which communicate with each other via a bus 408. The computer system 400 further includes a video display unit 410 (e.g., a liquid crystal display (LCD) or a cathode ray tube (CTR)). The computer system 400 further includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored a set of instructions (i.e., software 424) embodying any one, or all, of the methodologies described above. The software 424 is also shown to reside, completely or at least partially, within the main memory 404 and/or within the processor 402. The software 424 may furthermore be transmitted or received via the network interface device 420. For the purposes of the present specification, the term "machine-readable medium" shall be taken to include any medium that is capable of storing and encoding a sequence of instructions for execution by the machine, and that causes the machine to perform any one of the methodologies of the present invention. The term "machine-readable medium" shall accordingly be taken to include, but not limited to, solid-state memories, optical and magnetic disks, and carrier wave signals.

Thus, a method and apparatus for accumulating and summarizing data for defined time intervals within a customer interaction system been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of using a computer for processing customer interaction records within a customer interaction system including:

receiving an interaction record including interaction information describing a customer interaction wherein the interaction record contains a plurality of identified data items and a respective numerical value associated with each of the identified data items, the computer to perform the receiving;

identifying a cumulative record to which the interaction record contributes based upon a content of the interaction record, the computer to perform the identifying, the cumulative record containing a plurality of modifiable entries associated with different data types;

the computer determining how each entry of a plurality of entries of the cumulative record is to be modified by respective data items of the plurality of data items to reflect the interaction information within the interaction record based upon a data operation associated with each entry;

a thread pool with a plurality of threads processing each data item and respective numerical value of the plurality of identified data items of the interaction record in parallel; and modifying respective entries of the cumulative record in accordance with the data operation to reflect the interaction information contained within the interaction record, the computer to perform the modifying.

2. The method of claim 1 wherein the identification of the cumulative record is made utilizing time information included within the interaction information of the interaction record.

3. The method of claim 1 wherein the identification of the cumulative record is made utilizing data type information included within the interaction information of the interaction record.

4. The method of claim 1 wherein the identification of the cumulative record is made utilizing source information identifying a customer interaction system on which the customer interaction described by the interaction information occurred.

5. The method of claim 1 wherein the identification of the cumulative record includes providing a key, utilizing the interaction information, that is mapped to the cumulative record.

6. The method of claim 1 wherein the cumulative record is identified from among a plurality of cumulative records based upon a content of the interaction record, each of the plurality of cumulative records comprising a row of a result set that includes a plurality of columns, and wherein at least a first column specifying the data operation that determines how a cumulative record, including the entry corresponding to the first column is modified to reflect interaction information contained within an interaction record.

7. The method of claim 1 wherein the interaction information included within the interaction record comprises a plurality of information items, and the modifying of the cumulative record comprises performing the data operation with respect to processed information items included within the cumulative record, the processed information items corresponding to at least one information item included within the interaction record.

8. The method of claim 7, wherein the cumulative record comprises a plurality of processed information items, each of the processed information items being assigned to a respective column within a result set constituting a plurality of cumulative records, each of the respective columns of the result set having a respective data operation associated therewith.

9. The method of claim 8 wherein the data operation associated with the respective column comprises any one of a group of operations including a sum operation, a count operation, a copy operation, and a replace operation.

10. The method of claim 1 wherein the cumulative record contains interaction information derived from a plurality of interaction records for a predetermined time period.

11. The method of claim 10 wherein the cumulative record is stored within a database as part of a summarization record of customer interactions over the predetermined time, the summarization record comprising a plurality of cumulative records.

12. The method of claim 1 wherein the interaction information includes any one of a group of information items comprising source, date, time, call segment, response time, wait time, queue time, hold time and talk time.

13. The method of claim 1 wherein the customer interaction system comprises any one of a group of systems including an automatic call distributor, an e-mail server, a web server, a computer telephony integration server and an interactive voice response server.

14. A process that uses a computer for processing customer interaction records within a customer interaction system, of the process including:

a first process to receive an interaction record including interaction information describing a customer interaction, wherein the interaction record contains a plurality of identified data items and a respective numerical value associated with each of the data items and the first process operating to identify a cumulative record to which the interaction record contributes based upon an information content of the interaction record, wherein the cumulative record contains a plurality of modifiable entries each related to a different identified data item of the plurality of identified data items and at least a first entry of the cumulative record is associated with a data operation that determines how a second process modifies the first entry of the cumulative record to reflect the interaction information contained within the interaction record, the computer to perform the first process; and a plurality of threads of the second process to modify the plurality of entries of the cumulative record in parallel and in accordance with the data operation to reflect the interaction information contained within the first record, the computer to perform the second process.

15. The process of claim 14 wherein the first process identifies the cumulative record utilizing time information included within the interaction information of the interaction record.

16. The process of claim 14 wherein the first process identifies the cumulative record utilizing data type information included within the interaction information of the interaction record.

17. The process of the claim 14 wherein the first process identifies the cumulative record utilizing source information identifying a customer interaction system on which the customer interaction described by the interaction information occurred.

18. The process of claim 14 wherein the first process constructing a key, utilizing the interaction information, that is mapped to the cumulative record to identifying the cumulative record.

19. The process of claim 14 wherein the first process identifies the cumulative record from among a plurality of cumulative records, each of the plurality of cumulative records comprising a row of a result set that includes a plurality of columns, and wherein at least a first column specifying the data operation that determines how the cumulative record, including the entry corresponding to the first column, is modified to reflect the interaction information contained within the interaction record.

20. The process of claim 14 wherein the interaction information included within the interaction record comprises a plurality of information items, and the second process modifies the cumulative record by performing the data operation with respect to processed information items included within the cumulative record, the processed information items corresponding to at least one information item included within the interaction record.

21. The process of claim 20, wherein the cumulative record comprises a plurality of processed information items, each of the processed information items being assigned to a respective column within a result set constituting a plurality of cumulative records, each of the respective columns of the result set having a respective data operation associated therewith that constitutes part of the second process.

22. The process of claim 21, wherein the data operation associated with a respective column comprises any one of a group of the operations including a sum operation, a count operation, a copy operation, and a replace operation.

23. The process of claim 14 wherein the cumulative record contains interaction information derived from a plurality of records for a predetermined time period.

24. The process of claim 23 including a third process that stores the cumulative record within a database as part of a summarization record of customer interactions over the predetermined time, the summarization record comprising a plurality of cumulative records.

25. The process of claim 14 wherein the interaction information includes any one of a group of information items comprising source, date, time, call segment, response time, wait time, queue time, hold time and talk time.

26. The process of claim 14 wherein the customer interaction system comprises any one of a group of systems including an automatic call distributor, an e-mail server, a web server, a computer telephony integration server and an interactive voice response server.

27. A machine-readable medium that stores a sequence of instructions that, when executed by a machine, causes the machine to:
   receive an interaction record including interaction information describing a customer interaction, wherein the interaction record contains a plurality of identified data items and a respective numerical value associated with each of the identified data items;
   identify a cumulative record to which the first record contributes based upon an information content of the first record, the cumulative record containing a plurality of modifiable entries associated with different data types;
   determining how each entry of a plurality of entries within the cumulative record is to be modified by respective data items of the plurality of identified data items to reflect the interaction information contained within the interaction record based upon a data operation associated with the each entry;
   a thread pool with a plurality of threads processing each data item and respective numerical value of the plurality of identified data items in parallel; and
   modify respective entries of the cumulative record in accordance with the first data operation to reflect the interaction information contained within the information record.

28. A system for processing customer interaction records within a customer interaction system, of the system including:
   a first means to receive an interaction record including interaction information describing a customer interaction, wherein the interaction record contains a plurality of identified data items and a respective numerical value associated with each of the identified data items and the first means operating to identify a cumulative record to which the interaction record contributes wherein the cumulative record contains a plurality of modifiable entries each related to a different data item of the plurality of data items and at least a first entry of the cumulative record is associated with a data operation that determines how a second process modifies the first entry of the cumulative record to reflect the interaction information contained within the interaction record; and
   a plurality of threads of a second means to modify the plurality of entries of the cumulative record in parallel and in accordance with the data operation to reflect the interaction information contained within the interaction record.

* * * * *